US005469704A

United States Patent [19]

Kramer

[11] Patent Number: 5,469,704

[45] Date of Patent: Nov. 28, 1995

[54] HYDRAULIC DRIVE APPARATUS COMPRISING A CYLINDER

[75] Inventor: Otmar Kramer, Lohr/Main, Germany

[73] Assignee: Mannesmann Rexroth GmbH, Lohn/Main, Germany

[21] Appl. No.: 150,062

[22] PCT Filed: Mar. 13, 1993

[86] PCT No.: PCT/EP93/00583

§ 371 Date: Nov. 18, 1993

§ 102(e) Date: Nov. 18, 1993

[87] PCT Pub. No.: WO93/19301

PCT Pub. Date: Sep. 30, 1993

[30] Foreign Application Priority Data

Mar. 20, 1992 [DE] Germany .......................... 42 08 980.8

[51] Int. Cl.[6] .......................... F16D 31/02

[52] U.S. Cl. .......................... 60/455; 92/82; 92/86

[58] Field of Search .......................... 60/455; 91/41; 92/18, 20, 28, 82, 86, 165 R

[56] References Cited

U.S. PATENT DOCUMENTS

| | | | |
|---|---|---|---|
| 2,761,425 | 9/1956 | Bertsch et al. | 92/82 |
| 2,988,058 | 6/1961 | Warnecke | 92/28 |
| 4,084,668 | 4/1978 | Rybicki . | |
| 4,667,472 | 5/1987 | Clay et al. | 92/86 |

FOREIGN PATENT DOCUMENTS

| | | | |
|---|---|---|---|
| 1250566 | 12/1960 | France . | |
| 2313603 | 12/1976 | France . | |
| 2598185 | 11/1987 | France . | |
| 500128 | 6/1960 | Germany . | |
| 1550709 | 9/1970 | Germany . | |
| 2625240 | 12/1976 | Germany . | |
| 2855557 | 7/1980 | Germany . | |
| 3026877 | 2/1982 | Germany . | |
| 3705170 | 8/1988 | Germany . | |
| 45-6579 | 3/1970 | Japan | 92/28 |
| 809897 | 3/1959 | United Kingdom . | |
| 1260803 | 1/1972 | United Kingdom . | |
| 2186036 | 8/1987 | United Kingdom . | |

OTHER PUBLICATIONS

Die Passende Antwort, (Brochure of the Merkel Company–no date available).

*Primary Examiner*—F. Daniel Lopez
*Attorney, Agent, or Firm*—Cushman, Darby & Cushman

[57] ABSTRACT

The invention relates to a hydraulic drive apparatus having a cylinder. Said cylinder comprises a piston movably mounted in a working chamber, a piston rod which is guided towards the outside through a cylinder head and a wear resistant primary seal and a leakage free secondary seal. Both said seals act between the cylinder head and the piston rod, with the primary seal being closer to the working chamber than the secondary seal. Further, a leakage oil conduit is provided between the primary seal and the secondary seal. Such a hydraulic drive apparatus is to be improved such that the cylinder will hold or maintain a load in a certain position even if the pump is switched off for a long period of time. This is achieved by providing that the leakage oil conduit can be subjected to the load holding pressure by switching a valve.

22 Claims, 7 Drawing Sheets

HYDRAULIC DRIVE APPARATUS COMPRISING A CYLINDER

The invention relates to a hydraulic drive apparatus as set forth in the preamble of claim 1.

Such a hydraulic drive apparatus is known from DE 3026877A1. In DE 3026877A1 a hydraulic cylinder is disclosed having a piston rod which extends to through the cylinder head and is sealed by means of two seals. The primary seal which is located closer to the working or operating chamber of the piston is a ring which consists of a metal or another material having a stable shape, for instance a plastic material having the respective characteristics. Said primary seal is wear resistant but not free of leackage. For that reason between the primary seal and the secondary seal an annular collecting groove is provided for the leakage oil which is not held back by the primary seal; said leakage oil can be drained from said annular collecting groove by means of a leakage oil conduit extending from said annular collecting groove. Thus, the secondary seal is not subjected to the system pressure and load holding pressure, respectively. As a consequence, the wear of the secondary seal is small. The constant loss of leakage oil is a disadvantage of said known hydraulic drive apparatus, because said loss of leakage oil does not permit to maintain a load at a certain location or position in case the pump is switched off. In such a situation, the piston would slowly move away from its position and, as a consequence, also the load would change its position.

The problem underlying the present invention is to further develop a hydraulic drive apparatus having the features of the preamble of claim 1 in such a manner that the cylinder will maintain its position even if the pump is switched off.

This problem is solved for a hydraulic drive apparatus with the features of the preamble of claim 1 by providing that the leakage oil conduit is subjected to the load holding pressure by switching a valve. Thus, for a hydraulic drive apparatus of the invention there exists the possibility to stop the drainage of leakage oil via the leakage oil conduit by switching said valve; thus, if the pump is switched off, the piston and the piston rod of the cylinder no longer move due to the action of the load. The load holding pressure, which acts, when the piston rod is stationary, in the leakage oil conduit and in a possibly existent leakage oil collection space between the primary seal and the secondary seal, also acts upon the secondary seal. The secondary seal is strongly urged or pressed against the sealing surfaces of the piston rod and the cylinder head and also seals, free of leakage, with respect to the high load holding pressure. The strong or firm application or abutment at the stationary piston rod does, however, not lead to wear of the secodary seal which would jeopardize the life span of the cylinder. In case, the piston of the cylinder is moved then the leakage oil can be connected with the tank via the valve, so that the secondary seal is not subjected to the system pressure and applies at the sealing surfaces with a smaller tension (force), a tension which is, however, sufficient to provide for a leakage free sealing effect for the passage of the piston rod through the cylinder head, said tension being, however, also so small that the movement of the piston rod will lead only to a small wear of the secondary seal.

Preferred embodiments of the hydraulic drive apparatus of the invention can be gathered from the dependent claims.

The valve, which can be switched, so as to subject the leakage oil conduit to the load holding pressure is of a particularly simple design if the leakage oil conduit can be blocked by switching the valve in accordance with claim 2. Then, the load holding pressure in front of the secondary seal builds up along the piston rod. In case the pressure build-up should occur quickly, then it appears to be desirable that the leakage oil conduit is connectable via the valve to the pressure chamber of the cylinder at the piston rod side in accordance with claim 3.

So as to provide for movement of the piston of a cylinder in opposite directions, the pressure chamber on both sides of the piston can be respectively connected via a directional spool valve to a pump and to a tank. If it is desirable to keep the number of individual structural components of the hydraulic drive apparatus of the invention small, then it appears to be proper that, in accordance with claim 4, the leakage oil conduit is connected to the directionl spool valve and can be subjected to the load holding pressure by switching said directional spool valve. Inasmuch as the directional spool valve then needs to have five ports, its design might become complicated. Thus, in the preferred embodiment of claim 5 the leakage oil conduit is connected to an additional valve, and the leakage oil conduit can be subjected to the load holding pressure by switching said additional valve. The valve, which is connected to the leakage oil conduit is preferably designed such that it can be switched from an initial position into a switching position, in particular by means of a lifting or switching solenoid against the force of a return spring. Thus, the valve is held in its initial position by means of the return spring, possibly in connection with a second return spring. In case that the time during which the piston and the piston rod of the cylinder are moved is shorter than the time during which the piston and the piston rod have to be held against a load in a rest position, then, preferably, the leakage oil conduit can be subjected to the load holding pressure, preferably in the initial position of the valve. The time during which the lifting solenoid, which can also be part of a pilot stage of the valve has to be supplied with power (voltage), is then limited to the time during which piston and piston rod move.

In case that the leakage oil conduit is subjected to the load holding pressure, then said load holding pressure will also act upon the secondary seal and provide that the secondary seal is applied to the piston rod and to the cylinder head and provides a good sealing effect with respect to the oil under pressure. Favorably, the secondary seal should already be in abutment or in application with a certian bias at the piston rod and at the cylinder head, at the time the leakage oil can freely drain from the leakage oil conduit. Said bias (or pretension) can be achieved by matching with one another the dimensions of the piston rod, the seal and the receiving means of the seal in the cylinder head, i.e. one selects the inner diameter of the seal to be somewhat smaller than the diameter of the piston rod and/or the outer diameter of the seal is selected to be somewhat larger than the diameter of the receiving means in the cylinder head. Such a seal can be called inherently biased or self biased. It should be noted, however, that the mounting of the secondary seal can be carried out easier, if the seal can be externally biased up to a smallest axial dimension; said biasing occurs via a support ring which can be applied to a shoulder of the cylinder head. In case the support ring is applied at or in abutment with the shoulder, then the smallest axial dimension of the secondary seal is attained. Prior to the abutment of the support ring at the shoulder, the bias of the secondary seal can be adjusted to different values. It is, in particular, possible to re-adjust the bias even during the use of the cylinder. It is considered to be particularly preferable if the support ring in accordance with claim 10 can be biased by means of a hydraulically actuable piston which can be moved axially up onto the shoulder of the cylinder head. As long as the shoulder is not reached by the piston, the bias can be changed by changing the pressure applied to the piston. It can be easily recognized that such a possibility of changing the bias of the seal also has advantages if no primary seal and no leakage oil conduit are present. The bias of the seal can be adjusted independently of its tolerances and and it can be re-adjusted during the life span of the cylinder.

It is possibly sufficient to provide as a primary seal a close fit between the cylinder head and the piston rod. It would appear to be more advantageous to provide the primary seal in accordance with claim 11 as a separate seal which is inserted into the cylinder head. An enlargement of the play between the piston rod and the cylinder head will then not have the effect of an increased leakage oil flow.

In the preferred embodiment in accordance with claim 15, the cylinder head comprises two parts: a first part in which the secondary seal and the leakage oil conduit are located, and a second part, which comprises the work port or load port to the pressure chamber of the cylinder at the piston rod side. It is then easily possible to machine into the first and/or second part radially inwardly extending and axially open annular grooves, said annular grooves being open towards one side and adapted to create receiving means for additional parts; said additional parts can be easily placed in said receiving means. One such additional part can be the primary seal which can be located at the second part of the cylinder head; however, preferably, in accordance with claim 16, said primary seal is located like the secondary seal, at the first part of the cylinder head. Another additional part might, however, also be a guide sleeve for the piston rod which can be located by means of an outer land between the first and second part of the cylinder head. It should be noted that a two part design of the cylinder head can be of advantage independent of the features of the preceeding claims.

Preferably, in accordance with claim 17, a guide sleeve for the piston rod is arranged in the cylinder head between the primary seal and a work port to the pressure chamber on the piston rod side, so that a good lubrication between the piston rod and the guide sleeve is guaranteed. A plurality of embodiments of a hydraulic drive apparatus of the invention is shown in the drawings.

Referring to the Figures of said drawings, the invention will now be explained in detail:

Figure 1:
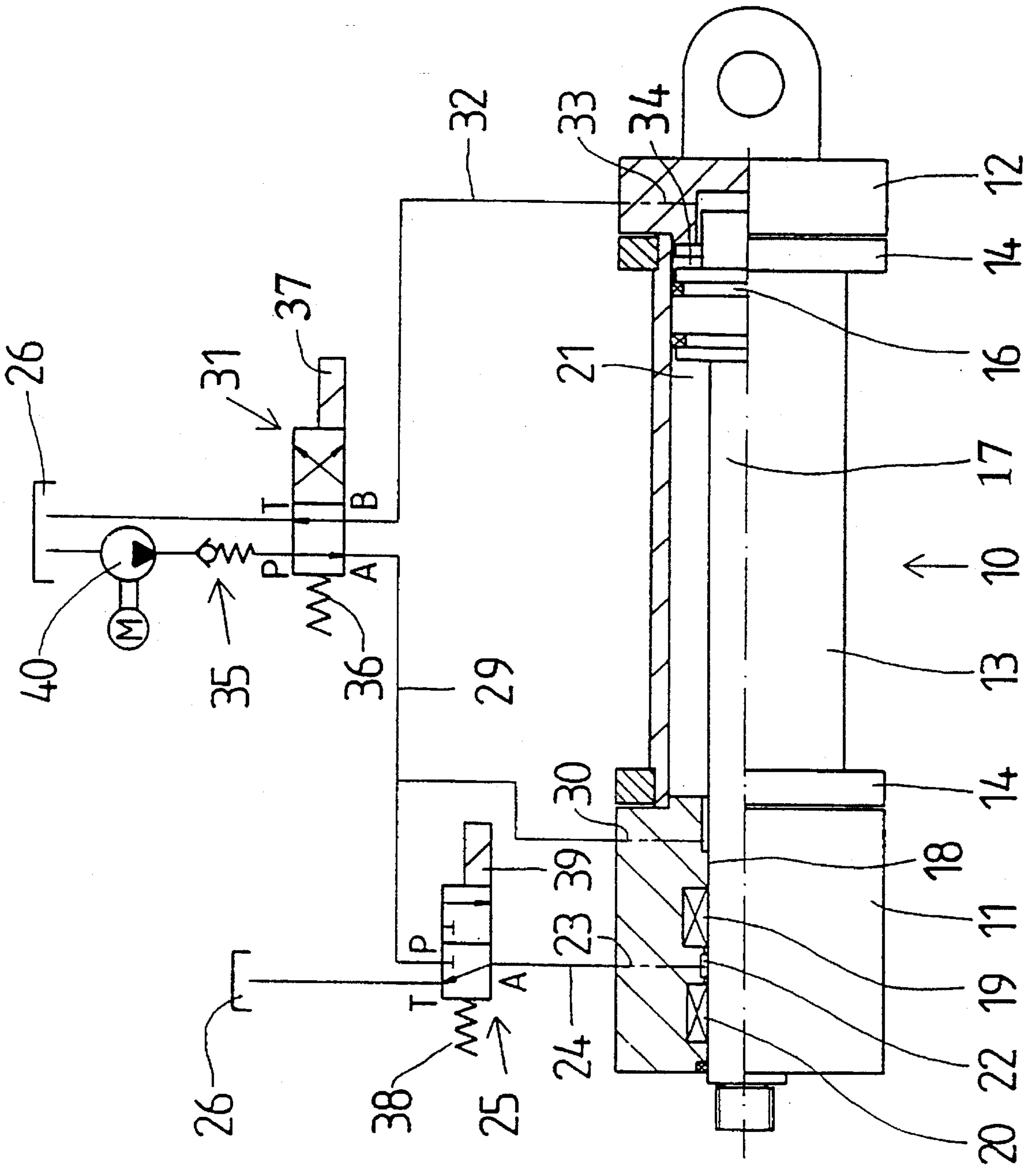
FIG. 1 is a representation of the principle of a first embodiment comprising a directional valve and an additional valve to which the leakage oil conduit is connected.
Figure 5:
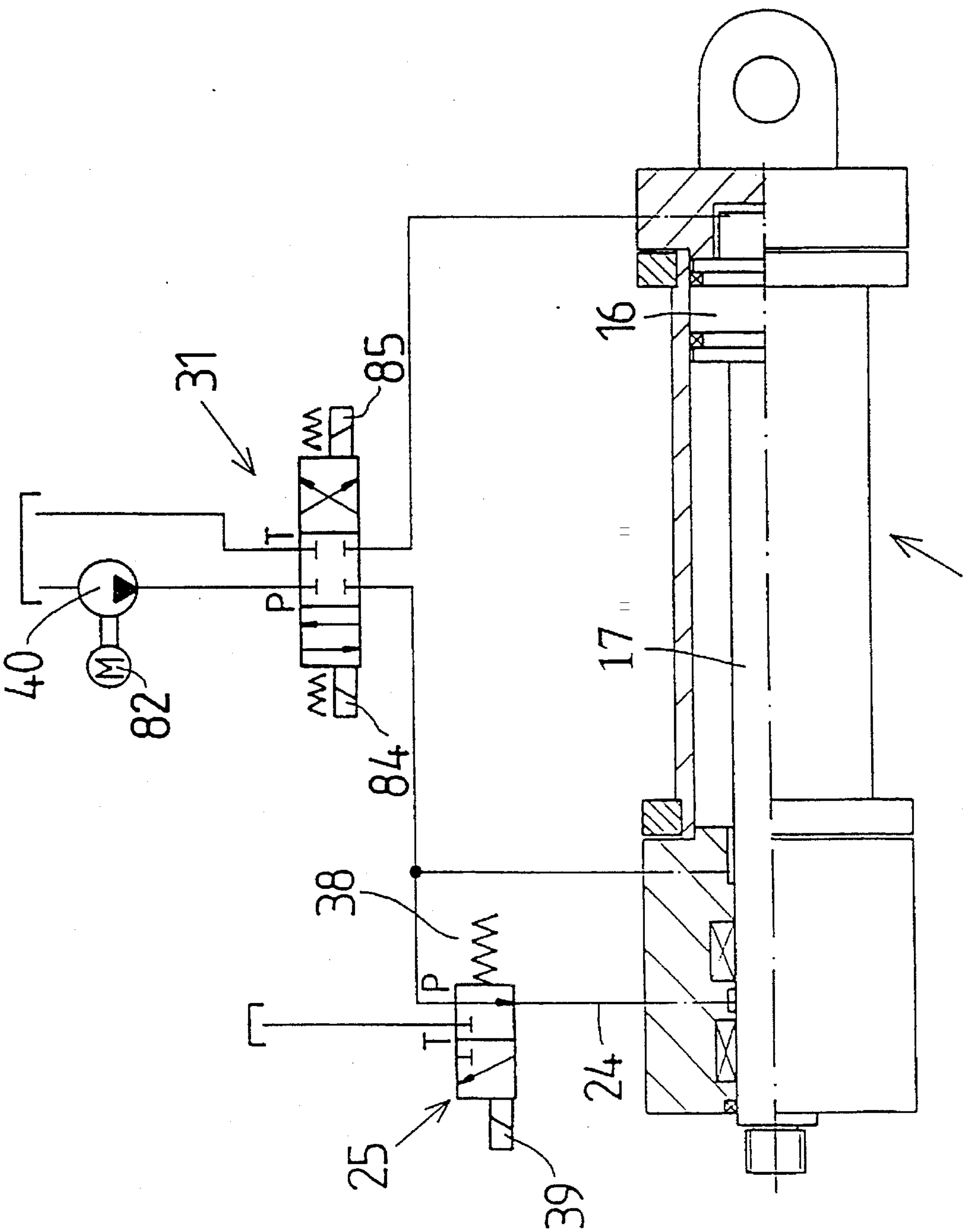
Figure 6:
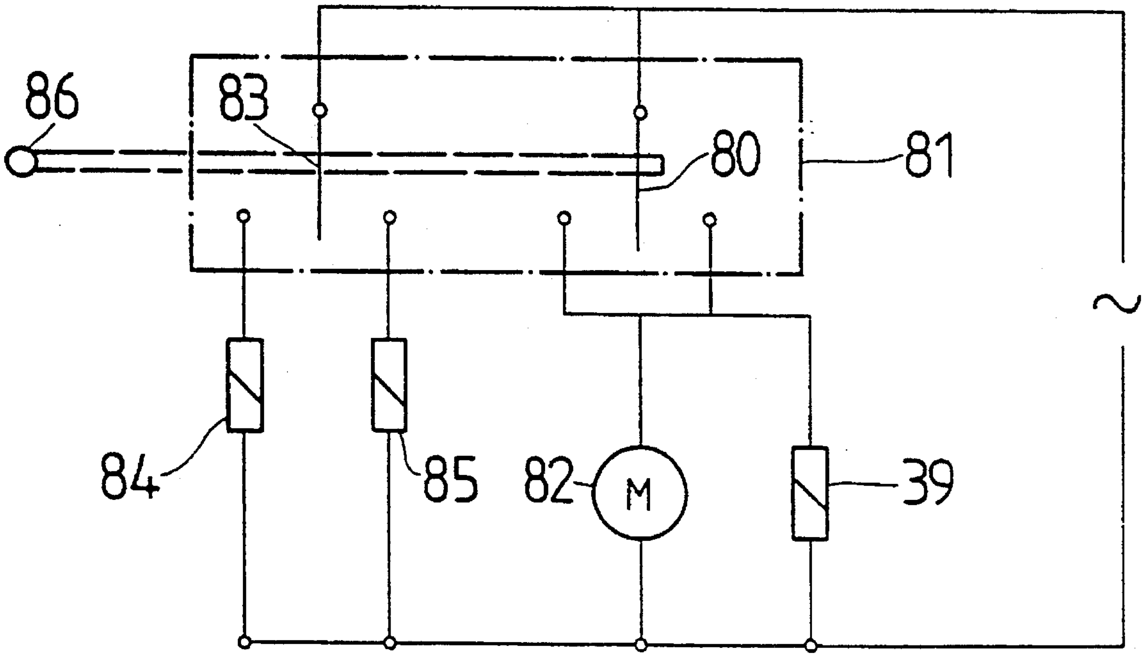
Figure 7:
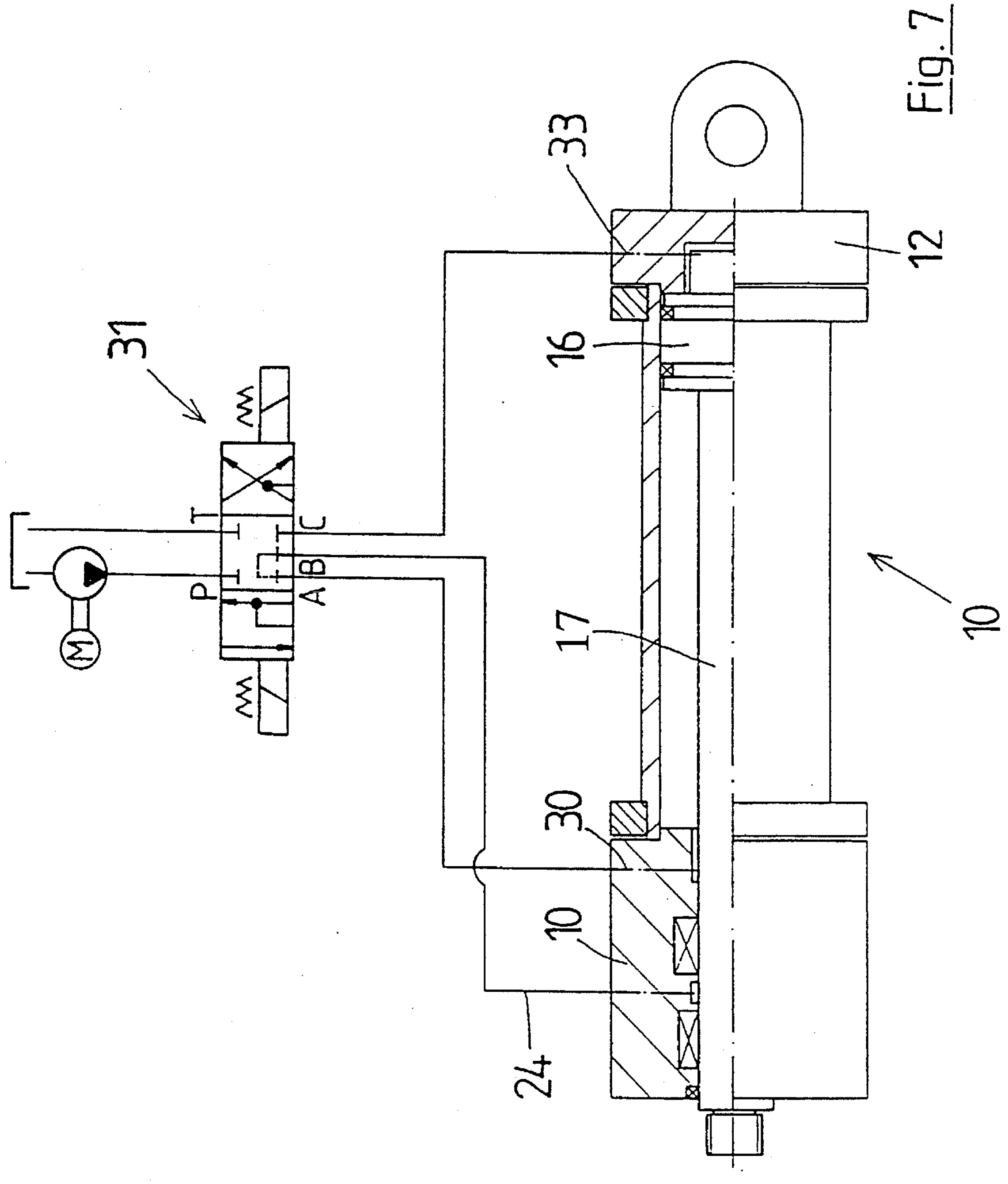

FIG. 5 discloses a fourth embodiment similar to the embodiment of FIG. 1, said fourth embodiment disclosing a different directional valve and a different control of the additional valve;

FIG. 6 is an electrical circuit arrangement for controlling the different electric components of the embodiment of FIG. 5 and FIG. 7 discloses a last embodiment according to which the leakage oil conduit is connected to the directional valve controlling the direction of movement of the piston in the cylinder.

The different embodiments of the hydraulic drive apparatus of the invention as shown in the figures comprise a cylinder 10 having a cylinder head 11, a cylinder bottom 12 and a cylinder tube 13 extending between said cylinder head 11 and said cylinder bottom 12. Each one flange 14 is screwed onto each one of the two ends of the cylinder tube 13; as is shown in more detail in FIG. 2 the cylinder head 11 and the cylinder bottom 12, respectively, are mounted to the respective flange 14 by means of axially extending screw bolts 15. The cylinder tube 13, the cylinder head 11 and the cylinder bottom 12 form an operating or work chamber within which a piston 16 is movably mounted; the piston 16 is mounted on a piston rod 17 which projects outwardly via a centrally located passage 18 in the cylinder head 11. Said passage 18 is sealed to be free of leakage towards the outside by means of two seals, a primary seal 19 and a secondary seal 20. The primary seal is located closer to the piston rod side pressure chamber 21 than the secondary seal 20; said primary seal is not free of leakage. Between the primary seal and the secondary seal, which are spaced from each other, an annular groove 22 is machined into the cylinder head 11; said annular groove 22 is open toward the piston rod 17 and serves as a collecting chamber or space for the leakage oil passing through the primary seal; a radial bore 23 extends from said annular groove 22 toward the outer surface of the cylinder head 11. The radial bore 23 is a part of a leakage oil conduit means generally referred to by reference numeral 24; said leakage oil conduit means is connected to the single output A of a 3/2 directional valve. The directional valve 25 also comprises two inputs T and P with the input T being connected to a tank 26.

Also provided within the cylinder head 11 is a working port 30 which leads to the piston rod side pressure chamber 21 and which is further connected via a conduit 29 with the output A of a 4/2 directional valve 31. A conduit 32 connects the output B of the directional valve 31 with a working port 33 in the cylinder bottom 12, said working port 33 leading to the piston side pressure chamber 34 of the cylinder 10. The input P of the directional valve 31 is connected to a pump 40 via a check valve 35, and the input T of the directional valve 31 is connected to the tank 26. The directional valve 31 serves for the control (reverse control) of the direction of movement of the piston 16 of the cylinder 10. The directional valve 31 comprises a valve spool which is not shown, and said valve spool assumes the shown switching position due to the force exerted by a spring 36. The valve spool can be moved leftwardly from its shown switching position (in FIG. 1), and the valve spool can also be moved rightwardly from the other switching position of the valve 31, said other switching position being assumed by the valve due to the action of a lift or switching solenoid 37.

The input P of the directional valve 25 is connected to conduit 29 which leads from the output A of the directional valve 31 to the working port 30 of the cylinder 10. The valve 25 is shown in its rest position which is assumed due to the action of spring 38; in this rest position the input P is blocked and the leakage oil can flow to the tank 26. In the switching position, to which the valve 25 can be switched by means of a solenoid 39, the leakage oil conduit 24 is connected with the input P and consequently with the conduit 29 the working port 30 of the cylinder, and eventually the pressure chamber 21.

The valves 25 and 31 are shown in FIG. 1 in their respective rest positions which are determined by the springs 38 and 36. Also, the pump 40 is operating. The piston 16 and piston rod 17 are close to the end of their reverse stroke in rightward direction; during the entire stroke towards the right leakage oil has been drained via the valve 25 to the tank 26, i.e. leakage oil which has passed through the primary seal 19. The secondary seal is not subjected to the system pressure acting in the pressure chamber 21; the secondary seal is pressed against the piston rod 11 with a predetermined lower force or tension which prevents that oil exits at the front side of the cylinder head 11, but keeps the wear relatively low. At the end of the stroke the pump 36 is switched off. The switching solenoid 39 moves the valve into the other switching position in which leakage oil conduit 24 is connected to the pressure chamber 21. No additional oil can be drained to the tank 26 so that the position of the piston rod 17 can be maintained against the action of the force. In the leakage oil conduit and in the leakage oil collection chamber 22 the load holding pressure builds up. The secondary seal 20 is subjected to said load holding pressure and applies itself more firmly to the piston rod 17 and the piston head 11, and, due to this stronger tension the exit of leakage oil at the front side of the cylinder head 11 is prevented even if the load holding pressure is applied. The firmer application (of the secondary seal) at the piston rod 17 barely increases the wear of the seal, inasmuch as the piston rod is not moved.

In case that the piston 16 and the piston rod 17 should be again moved towards the left then the switching solenoid 39 is switched off, so that the spring 39 brings the valve 25 into the rest position in which the leakage oil conduit 24 is releaved towards the tank 26. The tension of the secondary seal 20 is reduced, so that the movement of the piston rod towards the left does not lead to an increased wear of the seal.

Figure 2:
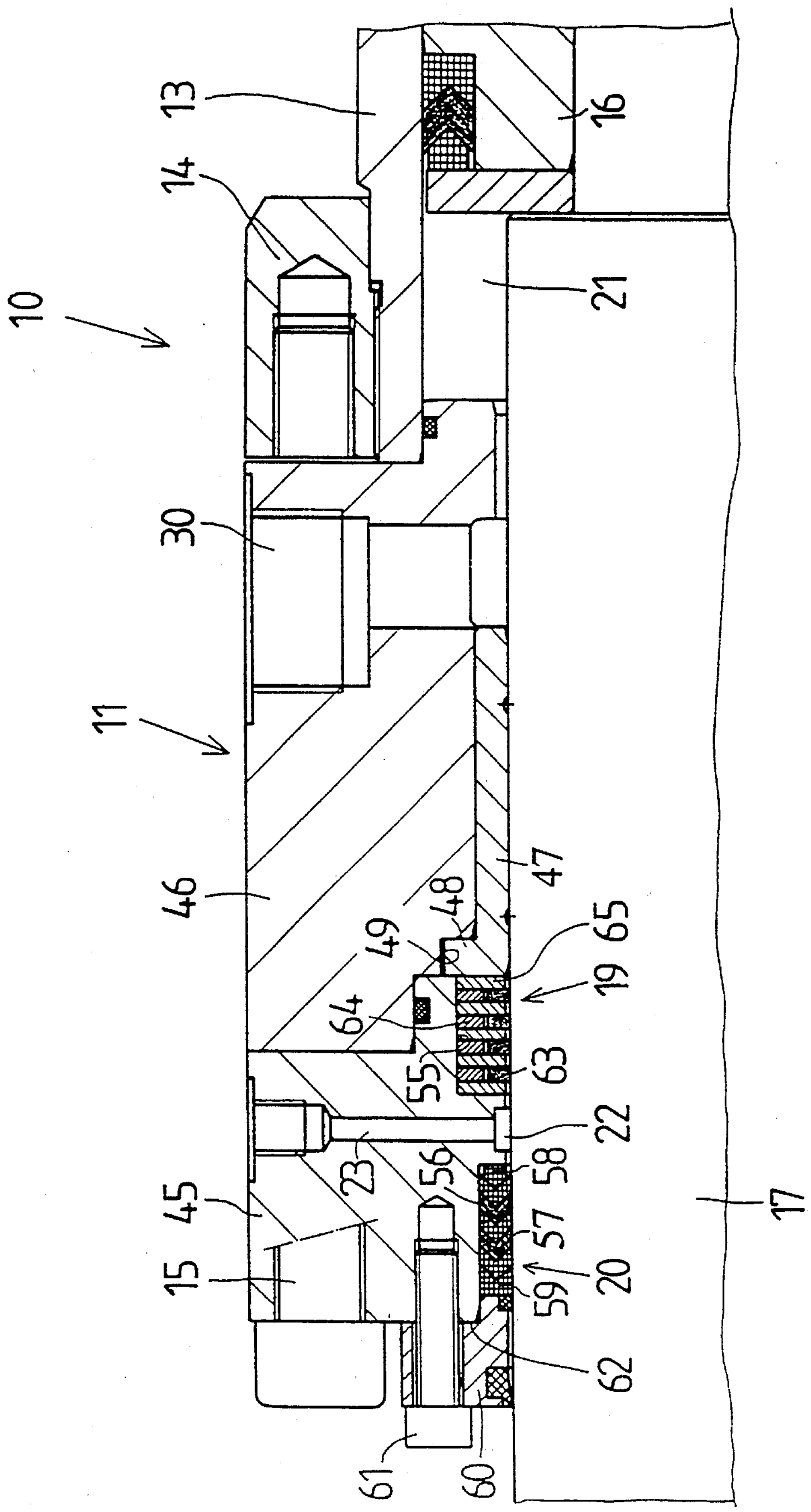
FIG. 2 shows a design representation of the cylinder of FIG. 1 in the area of the cylinder head.

FIG. 2 discloses some details of design of the cylinder 10 which is shown in general terms in FIG. 1. In FIG. 2 one recognizes the flange 14 which is screwedly mounted on the cylinder tube 13. The cylinder head 11 which is mounted to the flange 14 by means of screws or bolts 15 comprises a first cylinder head member 45 and a second cylinder head member 46. Said two members 45 and 46 are substantially axially spaced behind each other, and the cylinder head member 46 sits on the cylinder tube 13. In the cylinder head member 46, close to said cylinder tube 13, is the working port 30 which is connected with the piston rod side pressure chamber 21 beyond the working port 30; as seen from the pressure chamber 21, a guide sleeve 47 is located in the cylinder head member 46 by means of a slide fit (or slide seat). The guide sleeve 47 comprises at one end an outer land 48 and extends with said outer land 48 into an annular groove 49 of the cylinder head member 46, said annular groove 49 being open at its front side towards the cylinder head member 45. The axial dimension of the outer land 48 is equal to the axial dimension of the annular groove 49.

A first annular groove 55 and a second annular groove 56 are provided in the first cylinder head member 45; said first annular groove 55 is open towards the piston rod 17 and towards an end face side; the second annular groove 56 is also open towards the piston rod 17 and it opens towards the other end face side of the cylinder head member 45. Both annular grooves 55 and 56 are spaced from each other. Between said annular grooves the annular groove 22 is provided which serves as a leakage oil collection chamber. From said annular groove 22 the radial bore 23 extends outwardly.

The primary seal 19 is placed in the annular groove 55 and the secondary seal is placed in the annular groove 56. As a secondary seal a known sealing set of the chevron or roof shape sleeve type is used, a sealing set in which one or more seal rings 57 are axially surrounded by a pressure ring 58 and a support ring 59. If an axial pressure exists the seal rings are spread and will apply more or less firmly against the piston rod 17 and against the cylinder head member 45. The sealing rings 57 normally consist of a rubber/fabric combination. However, sealing rings of the roof sleeve type are known which are made only of rubber. The annular groove 56 is closed by a sealing flange 60 which is fixedly mounted by means of screws on a shoulder 62 of the cylinder head member 45 and which extends with a collar into the annular groove 56. The dimension of the sealing set 20 and the remaining length of the annular groove 56 determine the tension (force) exerted by the seal 20.

Also as the primary seal 19 a sealing set is used which is known per se. The sealing set comprises four metallic piston rings 63 which are in radial abutment with the piston rod 17 due to their inherent spring force. Behind each piston ring 63 a spacer ring 64 is located. Each one piston ring, and the spacer ring 64 located behind said ring, are separated by a cover ring from the adjacent piston ring and the adjacent spacer ring, and also each respective last ring on both sides of the sealing set is a cover ring 65. The axial depth of the annular groove 55 corresponds to the total thickness of the seal set 19, such that the one cover ring 65 is in alignment with the end face of the cylinder head member 45 facing towards the cylinder head member 46, and is in abutment or in application with the land 48 of the guide sleeve 47, said land 48 closing said annular groove 55. The outer land 48 of the guide sleeve 47 extends radially beyond the annular groove 65 such that the outer land 48 can be received between the first cylinder head member 45 and the second cylinder head member 46 and wherein the guide sleeve 47 maintains a fixed position in axial direction without exerting a pressure on the primary seal 19.

When the pistion 16 and the piston rod 17 are moved, the bore 23 is connected to the tank to which the leakage oil can be drained which passes the guide sleeve 47 and the primary seal 19. Tank pressure exists in the connecting chamber 22 such that the secondary seal 20 is not subjected to a load beyond the given bias. If the piston 16 is stationary then the drainage of the leakage oil is stopped. In the collection chamber 22 there is a build-up of the load holding pressure which applies the secondary seal 20 firmer against the piston rod 17 and against the first cylinder head member.

Figure 3:
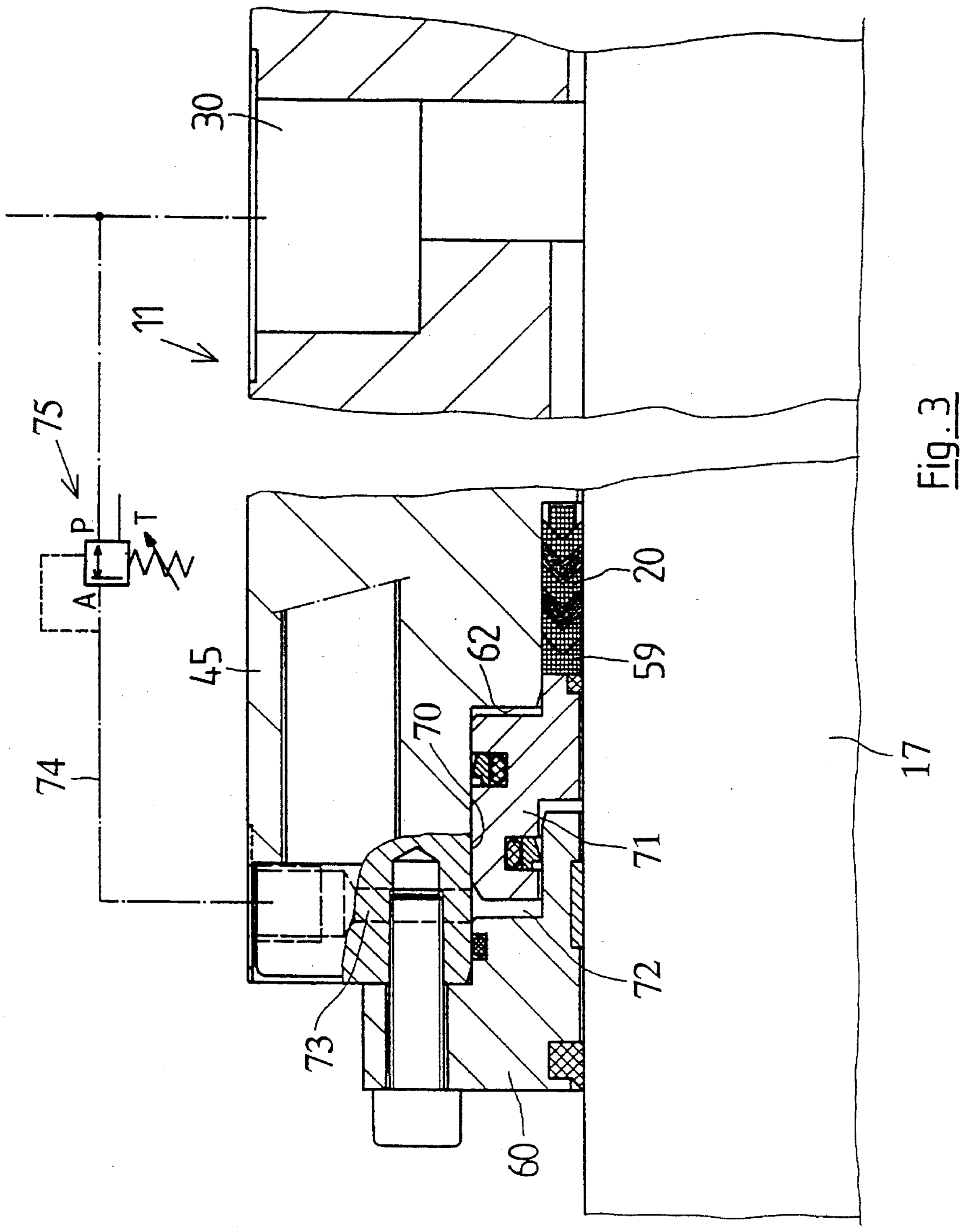
FIG. 3 is a sectional view of the cylinder head of a cylinder of a second embodiment.

The embodiment of FIG. 3 is similar to the embodiment of FIG. 2. Only those means are different by means of which the bias or the pretensioning of the secondary seal 20 is created, said secondary seal 20 again being in the form of a roof sleeve seal set. For this purpose, an annular spool 71 is provided which is located in an annular space 17 formed by the first cylinder head member 45 and the sealing flange 60; said annular spool 71 extends by means of an annular portion inwardly towards the piston rod 17 and is adapted to abut at the support ring 59 of the seal 20. A closed pressure chamber 72 is bordered by the first cylinder head member 45, the sealing flange 60 and the annular spool 71; from said pressure chamber a bore 73 extends radially outwardly through said first cylinder head member. The bore 73 can be connected by means of a conduit 74 to the working port 30 of the cylinder head 11; said conduit 74 may also include a pressure reducing valve 75. Whenever, see FIG. 3, the piston rod is moved towards the right, also the secondary seal 20 will be biased or pretensioned to a predetermined degree, a degree which can be adjusted by means of the pressure reducing valve 75. If it is desired to have said pretensioning or bias also in the opposite direction of movement of the piston rod 17, then conduit 74 together with the pressure reducing valve 75 can also be connected directly to the pressure port of the pump. The degree of pretensioning of the seal 20 is limited by the fact, that the annular spool 71 abuts after a determined travel or movement against the shoulder 62 of the cylinder head member 45.

Figure 4:
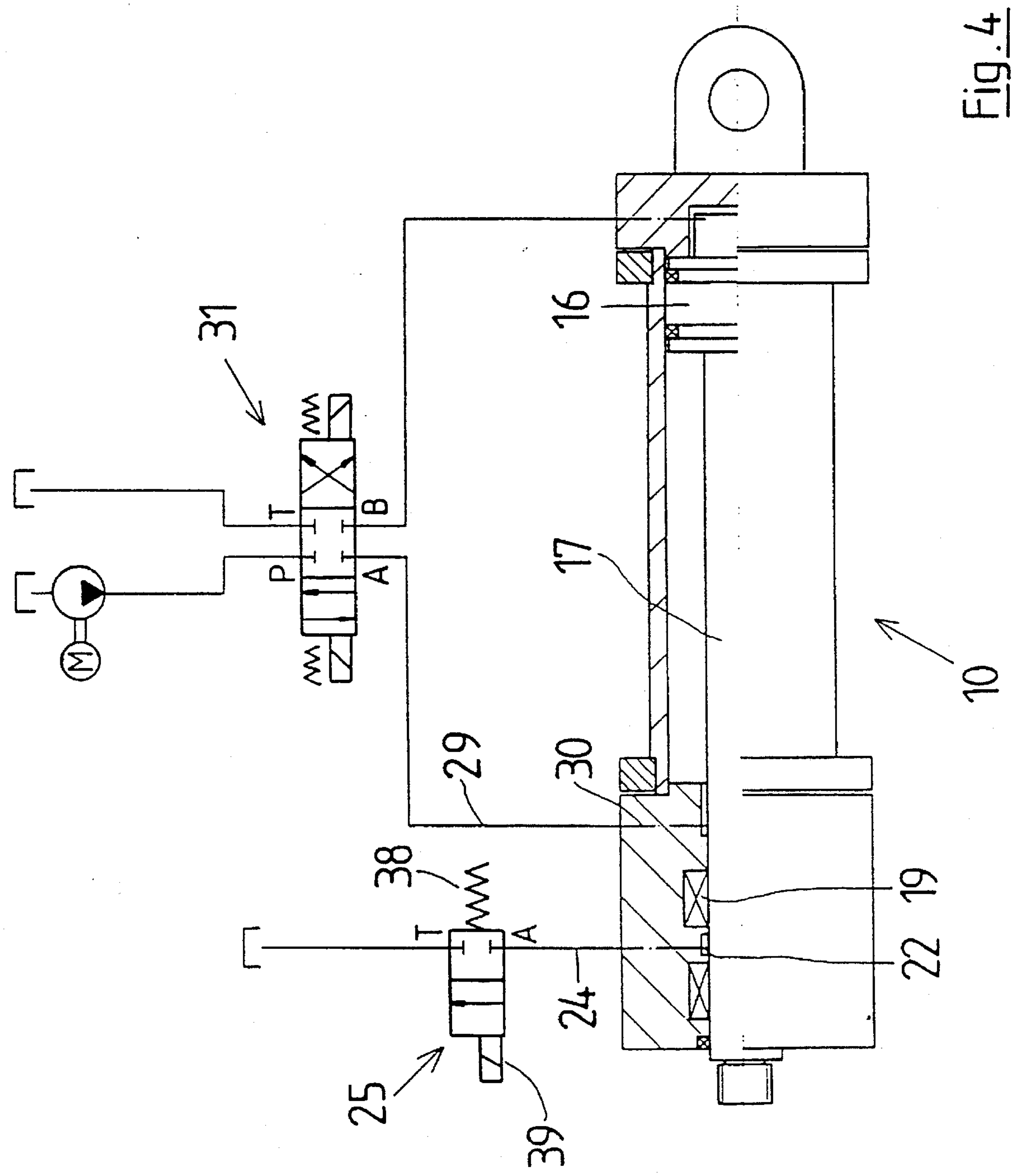
FIG. 4 is a third embodiment represented in a similar manner as the embodiment of FIG. 1, wherein said third embodiment shows that the leakage oil conduit can be blocked in one position of the additional valve.

In the embodiment of FIG. 4 the control of the direction of movement of the piston 16 and the piston rod 17 is carried out by means of a 4/3 directional valve 31, the four ports P, T, A, and B of which are blocked in the center position. The leakage oil conduit 24 is connected to a 2/2 directional valve 25 which in turn is held in its rest position by a spring 38 and which can be switched into its second switching position by a switching solenoid 39. In the rest position both ports are blocked and in the second switching position the leakage oil can be drained to the tank. Different from the embodiment of FIG. 1 the leakage oil 24 can only be blocked, but it can not be connected to the conduit 29 between the output A of the directional valve 31 and working port 30 of the cylinder 10. Thus, in this case, the load holding pressure in the leakage oil collecting chamber 22 is only built up via the primary seal 19.

In the embodiment shown in FIG. 5 again the control valve 31 of the design of FIG. 4 is used. The valve 25 comprises the same ports or inputs and outputs as the valve shown in FIG. 1. Also, the conduit ports are the same as in the embodiment of FIG. 1. Different is the following: Now, in the rest position of the valve, which is determined by the spring 38 the leakage oil conduit 24 is connected with the port P and, in the second switching position into which the valve 24 can be switched by the solenoid 39, the leakage oil conduit 24 is connected with the port T. This has as a consequence that the solenoid 39 needs to be energized, as long as the pump 40 is running (or on). Thus, the solenoid can be controlled as it is shown in FIG. 6, by means of a contact bridge 80 of an electrical switch 81 in parallel to an electric motor 82 which drives the pump 40. By means of a second contact bridge 83 of the same electric switch 81 further, either a solenoid 84 or a solenoid 85 of the directional valve 31 is switched on. Both contact bridges may be operated by the same actuating means 86.

In the embodiment of FIG. 7 the leakage oil conduit 24 is connected to an output B of a 5/3 directional valve 31. The 5/3 directional valve 31 controls the direction of movement of the piston 16 and the piston rod 17 and, in addition, fulfills the task of valve 25 of the earlier described embodiments. A port A is connected to the working port 30 in the cylinder head 10 and port C is connected to the working port 33 in the cylinder bottom 12. In the rest position of valve 31, as shown in FIG. 7, the ports P, T and C are blocked. Also, in a first alternative embodiment, the ports A and B may be blocked with respect to each other. This alternative corresponds to the embodiment of FIG. 4 in which, in the rest position of valve 25, the leakage oil conduit 24 is only blocked. In a second alternative embodiment the ports A and B may be connected internally with each other in the rest position of the valve 31 as is shown by a dashed line in FIG. 7. Then, the leakage oil conduit 24 is connected to the working port 30 of the cylinder 10 in the rest position of the valve 31. This last mentioned alternative corresponds to the embodiment of FIG. 5. However, in each situation one valve less is used.

I claim:

1. A hydraulic drive apparatus having a cylinder (10) which comprises:

a piston (16) movably mounted in a working chamber, a piston rod (17) extending outwardly through a cylinder head (11), a wear resistant primary seal (19) and a leakage free secondary seal (20), both said seals acting between the cylinder head (11) and the piston rod (17), wherein the primary seal (19) is arranged closer to the working chamber than the secondary seal (20), and a leakage oil conduit (24) between said primary seal (19) and said secondary seal (20), wherein said leakage oil conduit (24) is subjectable to a load holding pressure existing in a piston rod side pressure chamber (21) of the cylinder (10) by switching a valve (25; 31).

2. The hydraulic drive apparatus of claim 1, characterized in that the leakage oil conduit (24) can be blocked by switching said valve (25; 31).

3. The hydraulic drive apparatus of claim 1, characterized in that said leakage oil conduit (24) is adapted to be connected to the piston rod side pressure chamber (21) of the cylinder (10) by means of the valve (25; 31).

4. The hydraulic drive apparatus of claim 1, characterized in that pressure chambers (21, 34) on both sides of the piston (16) are adapted to be respectively connected via a directional valve (31) to a pump (40) and a tank (26), and that the leakage oil conduit (24) is connected to said directional valve (31) and can be subjected to the load holding pressure when switching said directional valve.

5. The hydraulic drive apparatus of claim 1, characterized in that pressure chambers (21;34) on both sides of the piston (16) are respectively connectable via a directional valve (31) to a pump (40) and a tank (26) and that the leakage oil conduit (24) is connected to an additional valve (25), said leakage oil conduit being adapted to be subjected to the load holding pressure by switching said additional valve (25).

6. The hydraulic drive apparatus as set forth in claim 1, characterized in that the valve (25; 31), which is connected to the leakage oil conduit (24) can be switched, preferably by a switching solenoid (39) from an initial position into a switching position against the force of a return spring (38) and that the leakage oil conduit (24) can be subjected to load holding pressure in the initial position of the valve (25; 31).

7. The hydraulic drive apparatus as set forth in claim 1, characterized in that an annular leakage oil collecting chamber (22) is provided in the cylinder head (11) between the primary and secondary seal (19, 20), said leakage oil conduit (24) extending from said leakage oil collecting chamber (22).

8. The hydraulic drive apparatus as set forth in claim 1, characterized in that the secondary seal (20) is biased or pretensioned due to the dimensions of the secondary seal and due to the given space for inserting said seal.

9. The hydraulic drive apparatus as set forth in claim 1, characterized in that the secondary seal (20) can be pretensioned up to a smallest axial dimension by means of a flange (60) which is preferably adapted to be applied to or in abutment with a shoulder (62) of the cylinder head (11).

10. The hydraulic drive apparatus of claim 1, characterized in that the secondary seal (20) can be biased by means of an hydraulically actuable spool (71) which is axially movable preferably up to a shoulder (62) of the cylinder head (11).

11. The hydraulic drive apparatus of claim 1, characterized in that the primary seal (19) is a separate seal which is inserted into the cylinder head (11).

12. The hydraulic drive apparatus of claim 11, characterized in that the primary seal (19) comprises a seal ring (63) made of a bending resistant (stiff) material, in particularly of a metal or a metal alloy.

13. The hydraulic drive apparatus of claim 12, characterized in that the primary seal (19) is a sealing set comprising a plurality of sealing rings (63) at least one cover ring (65)

separating two sealing rings (63) from each other and a spacer ring (64) behind each sealing ring (63), the thickness of said spacer ring (64) in axial direction being at least as large as the respective thickness of the respective seal ring (63).

14. The hydraulic drive apparatus of claim 11, characterized in that a cylinder head member (45) is provided with two annular grooves (55, 56) which are open towards oppositely located end faces, and wherein the primary seal (19) is inserted into one of said annular grooves and the secondary seal (20) is inserted into the other one of said grooves, and wherein further said grooves are closed by means of flanges (60; 71, 48).

15. The hydraulic drive apparatus of claim 11, characterized in that the cylinder head comprises two members (45, 46), that in said first member (45) the secondary seal (20) and the leakage oil conduit (24) are provided, and that a second member (46) comprises the working port (30) which leads to the piston rod side pressure chamber (21).

16. The hydraulic drive apparatus of claim 15, characterized in that the primary seal (19) is mounted at the first member (45) of the cylinder head (11).

17. The hydraulic drive apparatus of claim 16, characterized in that the primary seal (19) abuts at an outer land (48) of the guide sleeve (47), and the outer land (48) of the guide sleeve (47) extends radially beyond the primary seal (19) and is received between the first and second members (45, 46) of the cylinder head (11).

18. The hydraulic drive apparatus of claim 11, characterized in that a guide sleeve (47) for the piston rod (17) is mounted in the cylinder head (11) between the primary seal (19) and a working port (30) leading to the piston rod side pressure chamber (21).

19. The hydraulic drive apparatus of claim 18, characterized in that the primary seal (19) abuts at an outer land (48) of the guide sleeve (47).

20. A hydraulic drive apparatus comprising:

a hydraulic cylinder having a cylinder tube, a first closing means adapted to close said cylinder tube at one end, second closing means adapted to close said cylinder tube at the other end, first and second working ports (30,33) in said first and second closing means, respectively, a piston movably mounted in a working chamber defined by said cylinder tube and said first and second closing means, and defining a first and second pressure chamber, respectively, at opposite sides of said piston, at least one piston rod fixedly mounted to said piston, at least one seal means for said at least one piston rod, said at least one seal means comprising a first seal means (19) adapted to provide a sealing effect between said at least one piston rod and said first closing means, a second seal means (20) spaced axially outwardly from said first seal means and adapted to provide a sealing effect between said piston rod and said first closing means, said sealing effect occurring between said second seal means and said piston rod being controllable by pressure applied to said second seal means, such that a high pressure will cause a firm application of said second means and thus a high sealing effect, while a low pressure will cause a low sealing effect and a low wear condition if the piston rod were to move, and a leakage oil connecting means (24) arranged between said first and second seal means in said first and second closing means, respectively.

21. The hydraulic drive apparatus of claim 20, wherein means are provided for supplying a high pressure to said leakage oil collection means when there is high pressure in one of said pressure chambers.

22. The hydraulic drive apparatus of claim 21, wherein said means for supplying a high pressure are valve means connected between said leakage oil connecting means and said pressure chambers.

* * * * *